US011263045B2

(12) United States Patent
Poort et al.

(10) Patent No.: US 11,263,045 B2
(45) Date of Patent: Mar. 1, 2022

(54) INTEGRATED MULTI-PROVIDER COMPUTE PLATFORM

(71) Applicant: Rescale, Inc., San Francisco, CA (US)

(72) Inventors: Gregorius E. Poort, San Francisco, CA (US); Mulyanto W. Poort, San Francisco, CA (US); Ryan A. Kaneshiro, San Francisco, CA (US); Adam C. McKenzie, Walnut Creek, CA (US); Alexander D. Kudlick, San Francisco, CA (US); Mark G. Whitney, Berkeley, CA (US); Alexander P. Huang, Walnut, CA (US); Dongting Yu, San Francisco, CA (US)

(73) Assignee: RESCALE, INC., San Francisco, CA (US)

( * ) Notice: Subject to any disclaimer, the term of this patent is extended or adjusted under 35 U.S.C. 154(b) by 0 days.

(21) Appl. No.: 17/316,307

(22) Filed: May 10, 2021

(65) Prior Publication Data

US 2021/0271514 A1   Sep. 2, 2021

Related U.S. Application Data

(63) Continuation of application No. 16/399,091, filed on Apr. 30, 2019, now Pat. No. 11,010,194, which is a
(Continued)

(51) Int. Cl.
*G06F 9/48* (2006.01)
*H04L 29/08* (2006.01)
(Continued)

(52) U.S. Cl.
CPC .............. *G06F 9/4881* (2013.01); *G06F 8/61* (2013.01); *G06F 9/547* (2013.01); *G06F 21/105* (2013.01);
(Continued)

(58) Field of Classification Search
CPC .......... G06F 9/4881; G06F 8/61; G06F 9/547; G06F 21/105; G06F 2221/0768;
(Continued)

(56) References Cited

U.S. PATENT DOCUMENTS 8,904,343 B2   12/2014   Balko et al.
9,158,590 B2   10/2015   Boss et al.
(Continued)

OTHER PUBLICATIONS

W Chen, X. Qiao, J. Wei and T. Huang, "A Profit-Aware Virtual Machine Deployment Optimization Framework for Cloud Platform Providers," 2012 IEEE Fifth International Conference on Cloud Computing, Honolulu, HI, 2012, pp. 17-24, doi: 10.1109/CLOUD. 2012.60. (Year: 2012).
(Continued)

*Primary Examiner* — Melvin H Pollack
(74) *Attorney, Agent, or Firm* — Klintworth & Rozenblat IP LLP

(57) ABSTRACT

The present invention includes embodiments of systems and methods for addressing the interdependencies that result from integrating the computing resources of multiple hardware and software providers. The integrated, multi-provider cloud-based platform of the present invention employs abstraction layers for communicating with and integrating the resources of multiple back-end hardware providers, multiple software providers and multiple license servers. These abstraction layers and associated functionality free users not only from having to implement and configure provider-specific protocols, but also from having to address interdependencies among selected hardware, software and license servers on a job-level basis or at other levels of granularity.

9 Claims, 2 Drawing Sheets

Related U.S. Application Data continuation of application No. 16/008,465, filed on Jun. 14, 2018, now Pat. No. 10,387,198, which is a continuation-in-part of application No. 15/235,004, filed on Aug. 11, 2016, now Pat. No. 10,193,762.

(51) Int. Cl.

| | | |
|---|---|---|
| *H04L 29/06* | (2006.01) | |
| *G06F 9/54* | (2006.01) | |
| *G06F 21/10* | (2013.01) | |
| *G06F 8/61* | (2018.01) | |
| *H04L 12/24* | (2006.01) | |
| *H04L 67/53* | (2022.01) | |
| *H04L 67/01* | (2022.01) | |
| *H04L 41/022* | (2022.01) | |
| *H04L 41/00* | (2022.01) | |

(52) U.S. Cl.
 CPC ............ *H04L 41/022* (2013.01); *H04L 67/20* (2013.01); *H04L 67/42* (2013.01); *G06F 2221/0768* (2013.01); *G06F 2221/0775* (2013.01); *H04L 41/20* (2013.01)

(58) Field of Classification Search
 CPC ........... G06F 2221/0775; H04L 41/022; H04L 67/20; H04L 67/42; H04L 41/20
 USPC ........................................................ 709/205
 See application file for complete search history.

(56) References Cited

U.S. PATENT DOCUMENTS

| | | | |
|---|---|---|---|
| 9,507,748 B2 | 11/2016 | Hipp et al. | |
| 9,588,795 B2 | 3/2017 | McWilliams et al. | |
| 9,716,334 B1 | 7/2017 | Thompson | |
| 9,825,881 B2 | 11/2017 | Johnston et al. | |
| 9,851,953 B2 | 12/2017 | Straub et al. | |
| 9,916,538 B2 | 3/2018 | Zadeh et al. | |
| 9,923,952 B2 | 3/2018 | Maes et al. | |
| 9,967,146 B2* | 5/2018 | Franke | G06F 9/5072 |
| 9,967,267 B2 | 5/2018 | Ladnai et al. | |
| 9,992,072 B1 | 6/2018 | Chen et al. | |
| 10,031,783 B2 | 7/2018 | Jalagam et al. | |
| 10,038,721 B2 | 7/2018 | Overby, Jr. et al. | |
| 10,042,903 B2 | 8/2018 | Dhayapule et al. | |
| 10,044,640 B1 | 8/2018 | Levine et al. | |
| 10,049,337 B2 | 8/2018 | Mack et al. | |
| 10,062,354 B2 | 8/2018 | Dutt | |
| 10,069,693 B1 | 9/2018 | Daptardar et al. | |
| 10,073,880 B2 | 9/2018 | Li et al. | |
| 10,075,384 B2 | 9/2018 | Shear et al. | |
| 10,079,877 B2 | 9/2018 | Paramasivam | |
| 10,082,786 B2* | 9/2018 | Sait | G05B 19/042 |
| 10,084,721 B2 | 9/2018 | Biswas et al. | |
| 10,101,981 B2 | 10/2018 | Arumugam et al. | |
| 10,120,907 B2* | 11/2018 | de Castro Alves | G06F 16/24568 |
| 10,151,782 B2* | 12/2018 | Sum | H02J 3/00 |
| 10,169,086 B2* | 1/2019 | Cropper | G06F 9/5011 |
| 10,169,130 B2 | 1/2019 | Addison et al. | |
| 10,171,287 B2 | 1/2019 | An et al. | |
| 10,198,281 B2 | 2/2019 | Thakkar et al. | |
| 10,230,529 B2 | 3/2019 | Costa et al. | |
| 10,243,787 B2* | 3/2019 | Coote | H04L 12/2834 |
| 10,275,280 B2* | 4/2019 | Borlick | G06F 9/5044 |
| 10,282,222 B2* | 5/2019 | Thakkar | G06F 9/45558 |
| 10,305,814 B2 | 5/2019 | Conner et al. | |
| 10,355,870 B2* | 7/2019 | Cropper | H04M 15/8022 |
| 10,356,206 B2* | 7/2019 | Chen | H04L 67/32 |
| 10,372,421 B2 | 8/2019 | Mack et al. | |
| 10,379,906 B2 | 8/2019 | Qi et al. | |
| 10,411,975 B2 | 9/2019 | Martinez et al. | |
| 10,412,192 B2 | 9/2019 | Iqbal et al. | |
| 10,425,411 B2* | 9/2019 | Huang | H04L 9/3268 |
| 10,430,263 B2 | 10/2019 | Polar Seminario | |
| 10,452,451 B2* | 10/2019 | Miraftabzadeh | G06F 9/5083 |
| 10,452,605 B2 | 10/2019 | Wang et al. | |
| 10,467,036 B2 | 11/2019 | Anwar et al. | |
| 10,491,662 B2* | 11/2019 | Srikanth | G06F 16/958 |
| 10,515,326 B2 | 12/2019 | Waltz | |
| 10,545,474 B2 | 1/2020 | Cella et al. | |
| 10,671,628 B2 | 6/2020 | Sullivan et al. | |
| 10,691,502 B2* | 6/2020 | Burke | G06F 9/5088 |
| 10,713,589 B1 | 7/2020 | Zarandioon et al. | |
| 10,783,504 B2* | 9/2020 | Ferris | G06Q 50/184 |
| 10,817,530 B2* | 10/2020 | Siebel | G06F 8/35 |
| 10,877,796 B1* | 12/2020 | Kinney, Jr. | H04L 41/0806 |
| 10,884,807 B2* | 1/2021 | Shimamura | G06F 9/5027 |
| 10,891,569 B1* | 1/2021 | Werner | G06Q 10/06316 |
| 11,029,998 B2* | 6/2021 | Burke | H04L 67/1097 |
| 2004/0268337 A1 | 12/2004 | Culter | |
| 2009/0157419 A1 | 6/2009 | Bursey | |
| 2011/0131315 A1 | 6/2011 | Ferris et al. | |
| 2011/0138050 A1 | 6/2011 | Dawson et al. | |
| 2013/0242335 A1 | 9/2013 | Naitoh | |
| 2016/0013966 A1 | 1/2016 | Vaidyanathan et al. | |
| 2016/0034995 A1 | 2/2016 | Williams et al. | |
| 2017/0163732 A1 | 6/2017 | Saraf et al. | |
| 2018/0004868 A1 | 1/2018 | Adam et al. | |
| 2018/0041578 A1* | 2/2018 | Lee | H04L 47/70 |
| 2018/0152392 A1* | 5/2018 | Reed | G06F 9/45558 |
| 2018/0262388 A1 | 9/2018 | Johnson et al. | |
| 2018/0316572 A1* | 11/2018 | Kamalakantha | H04L 67/2809 |
| 2018/0357097 A1 | 12/2018 | Poort et al. | |
| 2020/0201854 A1 | 6/2020 | Miller | |

OTHER PUBLICATIONS

C. Zou, H. Deng and Q. Qiu, "Design and Implementation of Hybrid Cloud Computing Architecture Based on Cloud Bus," 2013 IEEE 9th International Conference on Mobile Ad-hoc and Sensor Networks, Dalian, 2013, pp. 289-293, doi: 10.1109/MSN.2013.72. (Year: 2013).

N. Loutas, E. Kamateri and K. Tarabanis, "A Semantic Interoperability Framework for Cloud Platform as a Service," 2011 IEEE Third International Conference on Cloud Computing Technology and Science, Athens, 2011, pp. 280-287, doi: 10.1109/CloudCom.2011.45. (Year: 2011).

U. Sharma, P. Shenoy, S. Sahu and A. Shaikh, "A Cost-Aware Elasticity Provisioning System for the Cloud," 2011 31st International Conference on Distributed Computing Systems, Minneapolis, MN, 2011, pp. 559-570, doi: 10.1109/ICDCS.2011.59. (Year: 2011).

Johan Tordsson et al. "Cloud brokering mechanisms for optimized placement of virtual machines across multiple providers," Future Generation Computer Systems, vol. 28, Issue 2, 2012, pp. 358-367. (Year: 2012).

Hameed, A., Khoshkbarforoushha, A., Ranjan, R. et al. A survey and taxonomy on energy efficient resource allocation techniques for cloud computing systems. Computing 98, 751-774 (2016). https://doi.org/10.1007/s00607-014-0407-8 (Year: 2016).

Anton Beloglazov, Jemal Abawajy, Rajkumar Buyya, "Energy-aware resource allocation heuristics for efficient management of data centers for Cloud computing," Future Generation Computer Systems, vol. 28, Issue 5, 2012, pp. 755-768. (Year: 2012).

H. Fu, Z. Li, C. Wu and X. Chu, "Core-Selecting Auctions for Dynamically Allocating Heterogeneous VMs in Cloud Computing," 2014 IEEE 7th International Conference on Cloud Computing, Anchorage, AK, 2014, pp. 152-159, doi: 10.1109/CLOUD.2014.30. (Year: 2014).

International Search Report and Written Opinion for PCT Application No. PCT/US2019/036426 dated Oct. 4, 2019, 8 pages.

* cited by examiner

INTEGRATED MULTI-PROVIDER COMPUTE PLATFORM

CROSS-REFERENCE TO RELATED APPLICATIONS

This application is a continuation of U.S. patent application Ser. No. 16/399,091, filed on Apr. 30, 2019, which is a continuation of Ser. No. 16/008,465, filed Jun. 14, 2018 which is a continuation in part of U.S. patent application Ser. No. 15/235,004, filed Aug. 11, 2016 and entitled "Dynamic Optimization of Simulation Resources," the disclosure of which is hereby incorporated by reference as if fully set forth herein.

BACKGROUND

Field of Art

The present invention relates generally to cloud-based platforms, and in particular to a cloud-based compute platform that resolves for end users the interdependencies that result from integrating third-party back-end hardware with third-party software across multiple providers.

Description of Related Art

Beginning with the advent of supercomputing in the 1960s, "high performance computing" (HPC) tasks were relegated to high-end expensive computer systems that only large companies could afford. HPC tasks are sometimes characterized narrowly (in Wikipedia and elsewhere) as requiring large amounts of computing resources for relatively short periods of time.

Such a characterization facilitates distinctions from other forms of supercomputing (HTC or "high-throughput computing", grid computing, MTC or "many-task computing" and others). We use the term HPC more broadly herein to encompass virtually all forms of supercomputing in which significant computing resources are required, even if only on a temporary basis—whether jobs consist of single tasks or multiple dependent and independent tasks, or are optimized for cost, use of computational resources, time required to complete individual tasks or an overall job, or other factors.

The PC revolution of the 1970s brought about a shift in traditional paradigms of client-server computing. Computing evolved gradually from server-based extremes (users of "dumb terminals" executing time-sharing tasks on remote mainframes and other high-end servers) to client-based extremes (users performing mostly local tasks on gradually more powerful personal computers), and eventually to hybrid forms of client-server computing in which distributed networks such as the Internet facilitate the hosting of an amalgam of hardware, software and networking services.

In these hybrid client-server environments, computing resources and functionality are allocated in many different ways across hosted servers and end-user clients. Yet, HPC tasks remained limited to server-based extremes, as they required high-end computing resources not typically available on a personal computer or even a single more powerful server.

With the emergence of cloud computing in the mid-2000s, HPC functionality became much more widely accessible and affordable to individuals and small companies, as well as large enterprises. Remote "on-demand" access to large amounts of computing resources dramatically lowered costs (and thus expanded access) by distributing the functionality of "high-demand" tasks across a vast array of networked physical and virtual computing resources. While cloud computing also provided hybrid client-server solutions in many other contexts, it offered a unique "distributed server-based" solution to the HPC world.

However, cloud computing has not been a panacea to HPC users. Significant problems remain due to the relative complexity of HPC jobs in comparison to traditional client-server and remote desktop applications. For example, before cloud computing, large enterprises purchased or leased expensive high-end servers and other computing resources and operated them on their own premises. While enterprises had the flexibility of selecting computing resources that matched their specific demands, the overhead cost of such computing resources was in many cases difficult to justify. The highest-end computing resources were required only for certain compute-intensive jobs, and sometimes only for certain portions of such jobs. In essence, enterprises had to plan for a "worst-case scenario."

Large enterprises relying on their own "on-premise" hardware often sacrificed access to the latest computing resources. Purchased or leased hardware is typically replaced toward the end of its lifecycle, by which point it is several years old and one or more generations behind the latest technology.

Moreover, end users were required to install and configure on their hardware each third-party software package they licensed from third-party "independent software vendors" or ISVs. Unlike installing a traditional desktop application, which requires little more than ensuring that the correct operating system is present, installing compute-intensive software is a more complex process due to the nature of HPC functionality. Such software frequently executes in parallel, with multiple instances of the software executing across multiple CPU cores, and often across multiple physical servers. Each job requires a unique configuration matching the requirements of the software to the hardware environment, including job-specific attributes relating to a user's compute model.

End users were responsible for addressing these hardware-software dependencies by matching the demands of each job to the hardware environment—wholly apart from the complexities of sharing the computing resources of that hardware environment with other end users within the enterprise running jobs in parallel. Moreover, end users were solely responsible for testing or "tuning" the software and hardware environment, and for generating "workflows" across and within individual jobs (such as extracting and analyzing intermediate as well as final results, combining multiple tasks in which the output of one task serves as the input to a subsequent task, perhaps based on various conditions, and an array of other more complex intra-job and inter-job functionality). In this context, we use the terms workflow, jobs and tasks somewhat interchangeably, though a workflow typically represents one or more jobs, each of which consists of one or more individual HPC tasks.

Even the introduction of public cloud services—such as Amazon's AWS ("Amazon Web Services, including "Elastic Compute Cloud" or EC2), Microsoft's "Azure" and Google's "Google Cloud Platform (GCP)—only partially addressed these problems. These public cloud platforms are often described as "infrastructure-as-a-service" or IaaS. In other words, these "back-end hardware providers" provide remote access to physical and virtual computing environments that obviate the need to purchase or lease hardware computing resources for a worst-case scenario. Such computing resources can be accessed remotely on an on-demand basis to dramatically lower costs.

In addition to public cloud providers, other back-end hardware providers provide "private clouds" or "private data centers" which often sacrifice virtualization functionality (and thus some level of security) in favor of high-end "bare metal" hardware designed for demanding HPC applications. For example, the provisioning of physical servers facilitates the use of faster networking technologies for intra-job communication, as such servers can be tightly coupled given their close proximity to one another. As with public cloud services, the computing resources of bare-metal providers can be accessed remotely on an on-demand basis to reduce costs.

However, whether an enterprise utilizes public clouds or private data centers (or a combination thereof, including their own physical hardware), most of the other problems referenced above remain—due to the interdependencies among various attributes of HPC tasks and the hardware and software environment in which they are executed. HPC users are still responsible for selecting the physical or virtual hardware environment that best addresses their needs.

For example, if certain jobs require the latest bare-metal hardware (which often comes at a premium cost), while other jobs require the flexibility of virtualization, users must either sacrifice one for the other, or incur the added complexity of contracting with multiple different back-end hardware providers. Moreover, users still must manage the differences among each of those hardware environments. Many cloud providers offer virtual "core types" with specified amounts of available computing resources, such as CPU cores, memory, storage, and network bandwidth. Bare-metal providers, on the other hand, offer more limited (but often more powerful) choices of computing resources based on the characteristics of their physical servers.

Even with these choices, users cannot simply specify their computing resource needs at a higher-level of abstraction, and have such needs automatically allocated among the various types of computing resources available from multiple back-end hardware providers. They are responsible for making such determinations on their own, often with incomplete information. HPC users are focused on their own needs, and not on the frequently-changing offerings of various back-end hardware providers. Moreover, any given enterprise lacks the volume of usage across multiple providers necessary to obtain the most cost-efficient pricing.

HPC users also sacrifice the ability to "mix and match" the computing resource demands of any particular job with the computing resources offered across multiple back-end hardware providers (including their own on-premise hardware). For example, they cannot execute a job that utilizes the high-end computing power of a bare-metal provider with their own existing storage, or that of a cloud provider. There is simply a lack of integration among the many different back-end hardware providers.

In addition to determining and managing the hardware environment, HPC users also must obtain the rights to execute particular software in a remote cloud environment. And they must install and configure the software for each job, as well as match the demands of a particular job (and the relevant software) with the appropriate amount of compatible hardware computing resources.

They must develop their own tools to implement custom workflows, as well as test or "tune" the software and hardware in advance of executing HPC jobs that are often complex, time-consuming and expensive. In short, they must manage all of the dependencies of each job on the provisioned hardware and software environment—including sharing data across clusters and physical servers, managing inter-cluster and inter-server communication, providing data security and privacy issues beyond those offered by back-end hardware providers, maintaining a compliant HPC environment in accordance with contractual, regulatory and other legal requirements, and many other aspects of complex HPC jobs.

Moreover, each ISV provides its own software license restrictions, typically by enforcing authentication and license management via third-party "license servers." Each ISV may impose different restrictions on the location of, and access to, its license server. Here too, HPC users are responsible for obtaining the rights and providing interfaces to each relevant license server (wherever such license servers may be physically located).

While back-end hardware providers "meter" the usage of provisioned clusters (or other units of hardware resources), HPC users must implement their own custom "per job" metering if they desire to monitor the cost of such IaaS resources on a per-job or other basis (at a higher or lower level of granularity). Moreover, if they desire to meter the usage of software (e.g., to gauge relative licensing costs), they must provide their own custom metering implementation.

In an effort to address some of these problems, a few vertical solutions have emerged, offering more of a "software-as-a-service" or SaaS solution than the IaaS solution offered by public and private cloud providers. For example, in addition to providing IaaS features, some large ISVs have integrated their own software with a back-end public cloud, or with their own hardware infrastructure. Such "ISV Clouds" offer users of their software a remote hardware platform for running HPC tasks.

However, users of such ISV Clouds are limited to a single software provider, a significant limitation that eliminates users who require a more diverse selection of software. Moreover, users still must address many of the dependencies discussed above with respect to software and hardware tuning and workflows, as well as the need to provide, install, configure and manage their own proprietary or third-party software—if even allowed by the ISV Cloud provider.

Other vertical solutions provide their own IaaS environments (whether directly or via a single third-party cloud provider), but with access to certain third-party software packages. These "HW Clouds" also suffer from many of the same limitations discussed above. While providing end users with a choice of software, their solutions are limited to the computing resources provided by a single back-end hardware environment. Such a significant limitation prevents users, for example, from taking advantage of more powerful servers available only from bare-metal providers, or more cost-effective solutions offered by other cloud providers.

What is needed is an integrated compute platform that addresses the shortcomings of existing solutions described above, and offers true "platform-as-a-service" (PaaS) functionality by providing HPC users with a remote platform that enables them to select from multiple back-end hardware providers and multiple ISVs while automatically resolving the interdependencies among those hardware and software environments. Such an integrated compute platform should also address the dependencies of software and other attributes of HPC jobs on the selected hardware environment.

SUMMARY

The present invention includes embodiments of systems and methods for addressing the deficiencies noted above by providing a cloud-based compute platform that employs abstraction layers for communicating with and integrating the resources of multiple back-end hardware providers, multiple software providers and multiple license servers. These abstraction layers and associated functionality free users not only from having to implement and configure provider-specific protocols, but also from having to address interdependencies among selected hardware, software and license servers on a job-level basis or at other levels of granularity.

The platform of the present invention automatically selects computing resources among hardware, software and license servers from among multiple providers (including on-premise customer resources) in accordance with higher-level user selections based on the demands of individual jobs and workflows. With respect to a given job defined by a user, the platform automatically interfaces with one or more back-end hardware providers to provision computing resources.

In one embodiment, an HPC user requests core types from specific back-end hardware providers, while in other embodiments the user's higher-level computing resource selections are translated into lower-level requests to one or more back-end hardware providers selected by the platform to optimize for the user's predefined goals (e.g., cost, execution time, particular computing resources, etc.). In other embodiments, the platform generates suggested computing resource selections automatically based upon an analysis of the user's needs, evidenced from the user's model and other input parameters.

In one embodiment, back-end hardware providers include multiple public cloud providers and private data centers, as well as computing resources located on an HPC user's own premises—all accessible via different APIs implemented within the platform's back-end hardware abstraction layer. For example, an HPC user's job might be executed on servers within a public cloud provider using networked storage located on the user's premises. Or the user's servers might be supplemented with the additional computing power of those offered by a cloud provider.

This integration of particular computing resources across multiple back-end hardware providers (including an HPC user's on-premise computing resources) offers an unparalleled level of flexibility not previously found in any HPC environment. HPC users need not be concerned with inter-provider communication and, for example, the transfer of data among computing resources in different hardware environments, as such tasks are handled automatically by the platform.

The platform also automatically installs and configures the selected software in the provisioned hardware environment (in some cases, across multiple different hardware providers) in accordance with the user's specified configuration and input data. The platform further establishes connections with relevant license servers via associated license files (including license keys) that govern a user's access to and usage of associated software and its components.

The platform provides users with workflow tools to facilitate not only the configuration of a single HPC task (e.g., executing a single simulation software package on a user's model), but also the configuration of more complex jobs involving multiple tasks performed serially or in parallel. For example, the output of one or more tasks might be provided as input to subsequent tasks or jobs, or individual tasks or jobs may be repeated with different parameters. Workflows include loops, conditions and other control flow computing constructs.

Moreover, users are provided with hardware and software "tuning" tools that enable users to test specific portions of a job or single task and, based on the results, reconfigure the computing resources and other attributes of the hardware and software environment before incurring the time and expense of executing a complex job or workflow. Because many jobs require the use of significant amounts of computing resources over many hours (or sometimes days, weeks or longer), the ability to test key portions of jobs in advance (particularly those portions that are repeated many times), and then iteratively revise initial hardware and software configurations, saves the user significant time and expense—both in advance of and during the actual execution of a complex workflow.

In one embodiment, the platform recommends hardware computing resource and/or software configuration options based on the results of hardware and software tuning in an effort to best match the available computing resources with the demands of an HPC user's job or workflow. Such demands are inferred from an analysis of the user's model, input data and intermediate results of tuning "test runs."

In one embodiment, while a user's workflow is being executed, the platform (in accordance with the user's workflow configuration) monitors intermediate results and initiates certain actions, such as repeating or conditionally performing selected tasks, or even halting the execution of the workflow (e.g., to prevent wasted computation in the event of a catastrophic error detected based on such intermediate results). In other embodiments, the platform (in accordance with an HPC user's workflow, including conditions, loops and other flow control constructs) invokes analytic software to perform analyses of intermediate as well as final results. In another embodiment, the platform discovers patterns among outputs of similar jobs and workflows (e.g., via supervised machine learning techniques), which it uses to support various recommendations, such as different allocations of hardware or software computing resources.

The platform enforces license server restrictions based on a license file provided by the user or generated by the platform. For example, a license file might limit a user's access to specified features of a software package. The platform connects to the relevant license server, via a license server abstraction layer, which enforces such restrictions.

The platform further includes a hardware and software metering module that monitors the execution of a user's workflow on the provisioned hardware environment. In one embodiment, such monitoring occurs at the granularity of an individual task, as well as a more complex job or workflow. Moreover, because a workflow (or component job or task) may be executed across multiple back-end hardware providers, such monitoring tracks specified components of a user's workflow, each of which may be metered differently by different back-end hardware providers. Such metering even extends, in one embodiment, to an HPC user's on-premise hardware, which typically has no metering capability itself.

While an individual back-end hardware provider may not distinguish one user's workflow or job from another, the platform tracks (in one embodiment) the utilization of individual hardware resources (e.g., CPU cores, memory, storage, network bandwidth, etc) for the purpose of monitoring usage of each resource associated with a user's workflow (or component jobs or tasks). Such usage is later correlated with various pricing schemes (e.g., established by different public cloud providers) to calculate fees and facilitate billing to users, their enterprises, partners or other entities.

It should be noted that the "customer" of a back-end hardware provider may be the provider of the platform of the present invention, or may (in other embodiments) be a third-party partner, an ISV or even an individual HPC user or enterprise. For example, a company might select its own cloud account for execution of its users' workflows (or components thereof), or the public or private cloud account of a third-party partner of the platform provider. In any event, by monitoring the execution of workflow components across multiple back-end hardware providers, the platform tracks hardware usage at a level of granularity sufficient to support virtually any desired pricing and billing mechanism.

The hardware and software metering module also supports monitoring an HPC user's usage of individual software packages or components thereof (at a workflow or job level, or virtually any other level of granularity). Such metering is facilitated by management of the connectivity to remote license servers, access to which is monitored by the platform. Such monitoring functionality extends beyond mere "checkout" and "checkin" events, and is also used as a basis of on-demand metering and pricing of software usage.

In another embodiment, such monitored usage information is employed as a basis for optimizing an HPC user's goals. For example, while faster hardware may generally be more expensive, slower hardware may result in increased software licensing costs. The platform optimizes for the HPC user's specified goal and makes recommendations for future jobs or workflows (or in advance in the case of hardware and software tuning "test runs"). In yet another embodiment, result-based pricing is supported by virtue of the fact that the platform monitors not only the usage of particular software (or component features), but also user-specified results.

It should be noted that, even if a user's workflow involves only the execution of a single software package on the hardware environment of a single back-end hardware provider, the software execution time may be only a subset of the hardware execution time. For example, a back-end hardware provider may charge for hardware usage from the moment a cluster of hardware is provisioned (until it is de-provisioned), even though only some of that time involves actual execution of the software. Additional "hardware usage" time may be required to configure and launch instances of the software, and to extract the results.

For more complex workflows, "software usage" time is allocated across multiple clusters or physical servers, multiple back-end hardware providers and multiple software packages (and component features thereof). Here too, the hardware and software metering module of the platform monitors such "software usage" at desired levels of granularity sufficient to support virtually any desired pricing and billing mechanism.

In another embodiment (discussed in greater detail in U.S. patent application Ser. No. 15/235,004, filed Aug. 11, 2016 and entitled "Dynamic Optimization of Simulation Resources," the disclosure of which is incorporated by reference herein), the platform also monitors the use of computing resources during the execution of a job or workflow, and provides a mechanism for dynamically optimizing such resources to address inter-instance dependencies.

The platform further includes a billing layer and associated functionality, in conjunction with the hardware and software metering module, to facilitate the platform's support of various different pricing schemes and detailed usage allocations for invoicing multiple different entities (individuals, HPC enterprises, ISVs, third-party partners, etc.). In one embodiment, the platform supports the calculation of fees based not only on metered usage or consumption-based on-demand pricing, but also on results-based, advance deposit, subscription, per-seat, concurrent user and other pricing models adopted by various provider entities.

Given the enhanced importance of data privacy and security issues when remotely executing HPC jobs and workflows in cloud-based environments, the platform provides an additional layer of data privacy and security by encrypting data (at provision, de-provision and compute-time) uniformly across multiple different back-end hardware environments. Such encryption further enhances (and is fully compatible with) whatever level of security is provided by different back-end hardware providers. The platform further includes a uniform "data management" interface that accounts for the different data structures and protocols employed by different back-end hardware providers.

In comparison with existing solutions, the advantages of the platform of the present invention are numerous. HPC users and enterprises are provided enhanced flexibility to match the demands of their jobs and workflows with the computing resources offered by multiple back-end hardware providers and multiple software providers. Yet, they retain the flexibility to leverage their existing on-premise computing environment (including "bring-your-own" or BYOL licenses and proprietary software, as well as on-premise compute and storage resources).

Moreover, the platform frees HPC users from integrating and configuring selected hardware and software (including license servers), even to the extent they "mix and match" different computing resources across multiple hardware and software providers (including on-premise hardware and software resources). Even within the context of a single back-end hardware provider, HPC users need not be concerned with the provisioning and de-provisioning of clusters of individual "virtual machines" (VMs), and the launching of instances of software across such VMs.

HPC users are provided with workflow and hardware and software tuning tools that not only provide enhanced flexibility in defining a complex workflow, but also minimize the resulting time and expense (or other optimized factors) of executing such workflows. Hardware and software metering provide convenient mechanisms for efficiently managing the time and expense of executing HPC workflows and jobs, as well as supporting a variety of current and future pricing, licensing and billing schemes. Moreover, they further enhance the flexibility and robustness of individual HPC workflows and jobs, by permitting the performance of conditional results-based actions (for execution as well as pricing purposes) both during and after execution of an HPC workflow or job.

In short, the integrated platform of the present invention frees HPC users not only from the constraints of limited hardware and software (and license server) choices, but also from the need to resolve the interdependencies that result from such multi-provider integration (including hardware and software compatibility issues, software installation and job and workflow configuration, license management, different licensing and pricing mechanisms, data security and privacy, etc.).

Additional aspects and embodiments of the platform of the present invention are described in greater detail below.

DETAILED DESCRIPTION

Detailed embodiments of the systems and methods of the present invention are illustrated in the accompanying Figures and described below. It should be noted that the present invention is not limited to the particular embodiments discussed below with reference to the Figures. For example, the present invention could be integrated into distinct server platforms with the functionality reallocated among fewer or more different conceptual modules (implemented in hardware and/or software, and allocated among server and client devices), reflecting different engineering tradeoffs, without departing from the spirit of the present invention. Additional embodiments of the systems and methods of the present invention (including additional standard and proprietary hardware and software) will be apparent to those skilled in the art.

The software components of the present invention illustrated in the following Figures are embodied in physical memory and processed by CPUs (single and/or multi-core) on physical servers (not explicitly shown) to implement the functionality of the present invention. Such physical servers and such memory may be located in public or private clouds, end-user premises or other computing environments (together with or apart from the software implementing users' HPC workflows and jobs) without departing from the spirit of the present invention. In one embodiment, HPC users access the platform of the present invention over the Internet via standard web browsers on their client devices (servers, desktops, laptops, mobile phones and other networked devices).

Figure 1:
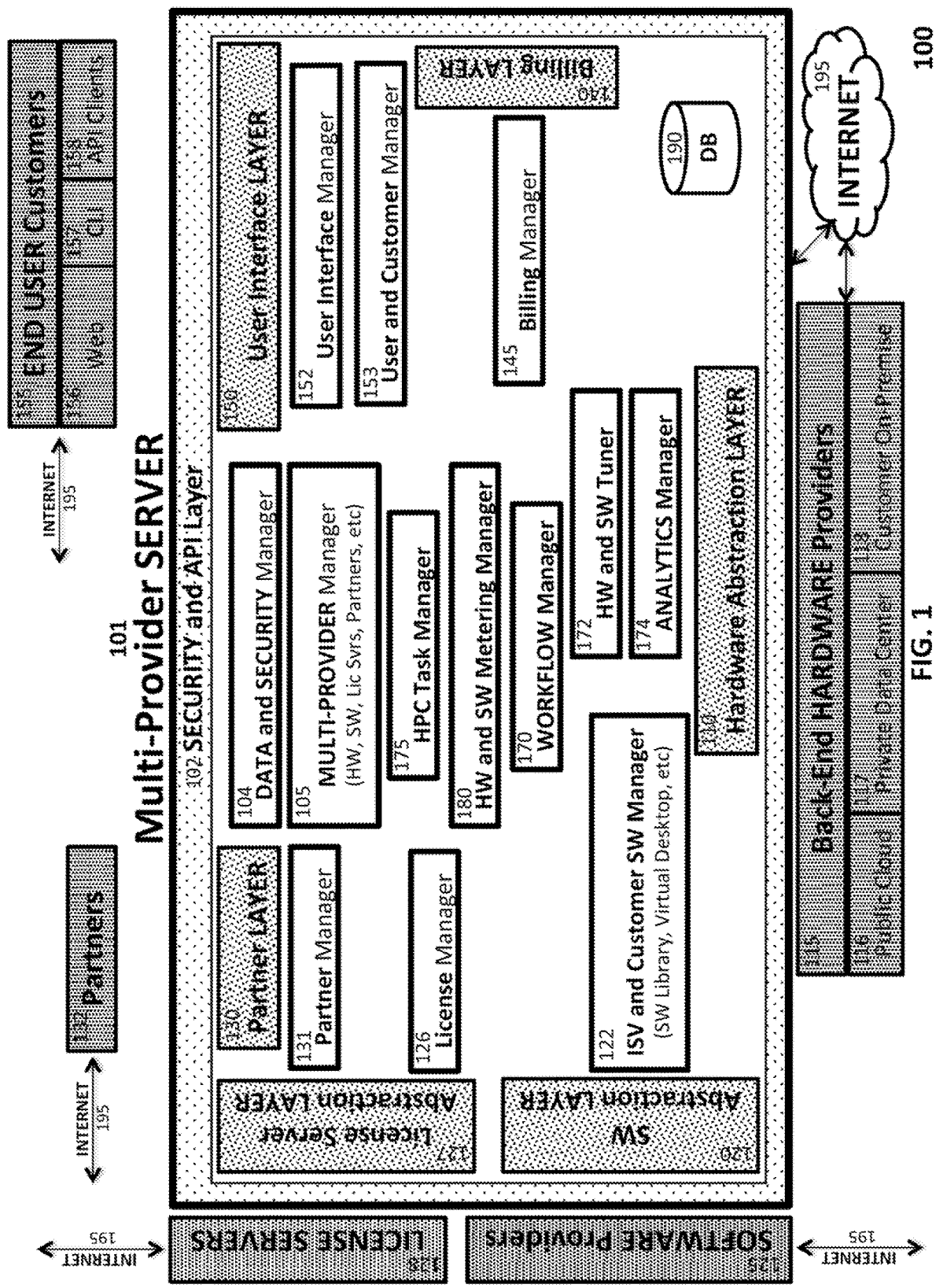
FIG. 1 is a system diagram illustrating one embodiment of key components of a multi-provider server of the cloud-based platform of the present invention.

Turning to FIG. 1, system diagram 100 illustrates one embodiment of a cloud-based platform of the present invention that is implemented by a Multi-Provider Server 101. We refer to the cloud-based "platform" interchangeably with the Multi-Provider Server 101, in that the functionality of the platform is implemented by Multi-Provider Server 101, which integrates functionality and resources from various other entities, all of which are interconnected via the Internet 195. HPC end-user customers 155 access Multi-Provider Server 101 over the Internet 195 via one or more different interfaces.

Most common is a web-based interface 156 that enables HPC users 155 to access the platform remotely (from their networked desktop and mobile client devices located virtually anywhere in the world) to generate and execute HPC workflows. Web-based interface 156 provides the most user-friendly interface for the generation and execution of workflows, as well as the viewing of results. Advanced HPC users 155 can also perform much of this functionality via a command-line interface (CLI) 157—akin to the use of "terminal" command-line interfaces (rather than the standard GUI interface) on desktop computers.

In certain situations, HPC users 155 employ API clients 158 to access the platform, enabling them, for example, to integrate their own custom software with the invocation of HPC workflows and jobs. Multi-Provider Server 101 implements various APIs, included within a Security and API layer 102, to facilitate such access to the platform.

In one embodiment, an HPC user 155 desires to utilize its own on-premise hardware and software environment in a manner that is otherwise independent of the platform. However, for certain relatively demanding jobs, the HPC user 155 desires a "burst" capability that enables on-demand use of additional computing resources available from Back-End Hardware Providers 115 integrated with the platform. In such scenarios, particular APIs in Security and API layer 102 (discussed below) permit a custom script running on the HPC user's 155 on-premise environment to invoke a predefined workflow or job on the platform that supplements the HPC user's 155 on-premise job and returns the results to the HPC user 155.

In this embodiment, the APIs facilitate the exchange of data (including job configuration, input data, intermediate data if the job is in progress, and results) between the HPC user 155 and the platform. As a result, the HPC user 155 can simply click a button on the platform's website, causing a job to run entirely on the platform (including installation and configuration of the relevant software), or partially on the user's laptop (for example), with "burst" capability to continue on the platform when additional computing resources are required.

User interface layer 150 facilitates the two-way communication between the platform and the various different interfaces provided to HPC users 155. User Interface Manager 152 generates the various different user interfaces presented to HPC users 155. In one embodiment, such interfaces include a web-based form enabling an HPC user 155 to select software from an available library, as well as hardware computing resource options. Another web-based forms enables the HPC user 155 to input their model, software configuration and input data specific to a workflow or job. Additional user interfaces include workflow tools for combining individual HPC tasks and implementing loops, conditions and other control flow constructs to control the execution of the workflow (as well as hardware and software tuning tools to test portions of a workflow or job, and reconfigure hardware and software resources, before initiating execution of the "full" workflow).

User and Customer Manager 153 generates and maintains a database of user entities, including individual HPC users 155 and their company affiliation (and user-specific access control and other limitations). This "user database" is maintained in DB 190. Storage of this user data, as well as other data utilized by Multi-Provider Server 101 can of course be distributed across other storage devices in various different locations without departing from the spirit of the present invention. In the embodiment illustrated in FIG. 1, DB 190 is also employed to store information specific to various other entities, such as third-party partners and providers of back-end hardware, software and license servers.

In this embodiment, the functionality of Multi-Provider Server 101 (including DB 190) resides on the virtual and physical computing resources of one or more of the Back-End Hardware Providers 115. The owner/operator of the platform administers the platform's functionality remotely from client devices on its own premises (not shown).

Security and API layer 102 includes a security mechanism (implemented via Data and Security Manager 104) that encrypts data at provision, de-provision and compute-time to ensure a uniform level of data privacy and security that complements whatever security is provided by other entities accessing the platform. The platform employs APIs within Security and API layer 102 for a variety of different purposes, depending upon the type of entity being accessed, as is discussed in greater detail below.

Data and Security Manager 104 also implements uniform data structures that are employed internally, and then translated for communication to various entities. For example, even public cloud providers 116 have different data structures and APIs for storing and retrieving data (analogous to different file systems on desktop computers). To move data back and forth among different Back-End Hardware Providers 115, the platform must translate to and from its universal format and communicate with the different APIs of these Back-End Hardware Providers 115.

Moreover, software often assumes that storage is "local," requiring the platform to abstract the actual physical (or virtual) locations of the data when configuring the software for a particular workflow or job. In one embodiment, if performance is significantly affected by the location of the storage, the platform performs translations before and after a job is executed to ensure that, during execution, local storage (i.e., where the job is executed) is maintained for performance reasons.

By handling inter-node (e.g., inter-VM) communication, as well as communication across multiple different Back-End Hardware Providers 115, at a job level, the platform frees users from having to address such dependencies. Moreover, a public cloud provider 116 meters usage at a VM or physical server level, whereas an individual job or workflow may involve multiple VMs or physical servers. In one embodiment, if one of the VMs experiences a hardware failure, the platform saves the job state, re-provisions another VM and restarts the job to avoid a more significant failure. In many cases, the software may effectively be "unaware" of the pausing/restarting of the job.

In another embodiment, the platform performs pre-job diagnostics (e.g., CPU, disk performance and network latency tests) to assess the "robustness" of the hardware environment and minimize the risk of having to halt execution of a job. In other embodiments, additional resources are allocated to provide a level of redundancy for similar reasons.

Multi-Provider Manager 105 provides additional functionality to manage the overall relationships and communications with various different types of provider entities (including HPC users 155, Partners 132, Back-End Hardware Providers 115, Software Providers 125 and providers of License Servers 128). Multi-Provider Manager 105 communicates internally with various platform modules that manage direct communications with such entities.

In one embodiment, the owner/operator of the platform contracts with various third-party Partners 132 to manage certain aspects of its relationship with HPC users 155. For example, a Partner 132 may be responsible for soliciting individuals and enterprises to become HPC users 155, and for managing the contractual and billing relationships with those solicited HPC users 155, as well as facilitating the integration of on-premise computing resources of those solicited HPC users 155 with the platform. Partners 132 may also effectively serve as Back-End Hardware Providers 115 and provide their own hardware infrastructure, or employ that of a public 116 or private 117 cloud provider for the benefit of their solicited HPC users 155.

Partner Layer 130 implements communications between the platform and individual Partners 132, involving translations of various different data structures, protocols and APIs. Partner Manager 131 implements such translations and interfaces with various platform components, such as Billing Layer 140, which is responsible for exchanging fees, invoices and related reports with Partners 132, HPC users 155, Back-End Hardware Providers 115 and Software Providers 125, among other entities. Billing Manager 145 implements such fee calculations, generates invoices and related reports and manages payments (interfacing with Multi-Provider Manager 105 and Hardware and Software Metering Manager 180, as well as other internal platform components).

Among the most significant entities integrated with the platform are Back-End Hardware Providers 115. As alluded to above, the workflows and jobs of HPC users 155 are not executed directly by Multi-Provider Server 101. Instead the platform integrates with the computing resources provided by multiple different hardware providers, including public cloud providers 116, private data center providers 117 and the on-premise computing resources 118 provided by HPC users 155.

As explained in greater detail below, the platform permits an HPC user 155 to select computing resources from one or more of the available Back-End Hardware Providers 115 (even for an individual workflow or job). In one embodiment, those choices are filtered by the attributes of the particular workflow or job designed by the HPC user 155. For example, if a particular software package is unavailable on the hardware environment of a particular Back-End Hardware Provider 115, then the computing resource options provided by that Back-End Hardware Provider 115 will be absent from the user interface seen by the HPC user 155. In another embodiment, the lack of such options will not be apparent in the user interface (e.g., in a list of higher-level computing resource options), but such incompatible options will not be chosen internally by Multi-Provider Server 101.

Access to the different computing resource environments of the Back-End Hardware Providers 115 is managed by Hardware Abstraction Layer 110, which translates internally-generated uniform formulations of computing resources into the specific core types, physical servers or other options offered by individual Back-End Hardware Providers 115. In one embodiment, the platform (with the assistance of Multi-Provider Manager 105) analyzes the higher-level requirements of the workflow or job specified by an HPC user 155, such as a need for 100 CPU cores. Such higher-level requirements might be satisfied by different core types from two different Back-End Hardware Provider 115—one provider offering 10 nodes (servers), each having 10 CPU cores/node, and the other provider offering 20 nodes, each having 5 CPU cores/node.

If HPC user 155 specifies overall cost as the sole optimizing factor, the latter choice may be less expensive, as the cost of 10-core nodes may be more than double the cost of 5-core nodes. But, if the HPC user 155 instead desires to optimize for time (e.g., preferring a job that completes in 1 day instead of 3 days, even at a greater cost), the former choice may be preferred—e.g., because the inter-node communication overhead among 10 nodes (as opposed to 20 nodes) results in significantly faster overall job execution time. In one embodiment, the platform automatically makes this decision in accordance with the optimization factors specified by HPC user 155. In other embodiments, the platform presents detailed recommendations from which HPC user 155 makes the final decision. It will be apparent to those skilled in the art that other tradeoffs of various different factors, and other implementations of this comparison among multiple different choices of hardware computing resources, may be considered in making this decision.

In another embodiment, the selected computing resources with respect to an HPC user's 155 individual workflow or job are implemented on the virtual and/or physical hardware environments of multiple Back-End Hardware Providers 115. In making this determination, the platform considers various factors, including the model, software and configuration and input data provided by HPC user 155, as well as optimization parameters (e.g., total calendar time, execution time, cost, etc.) specified by HPC user 155, as referenced above.

In addition to utilizing Hardware Abstraction Layer 110 to provision selected computing resources, the platform also employs Hardware Abstraction Layer 110 to manage the two-way communication with the Back-End Hardware Providers 115 for the purpose of monitoring execution of workflows (with respect to both hardware and software components), de-provisioning computing resources and performing various billing and other functions.

For example, while certain Back-End Hardware Providers 115 have their own "schedulers" for allocating computing resources to a job, the platform essentially provides a higher-level scheduler that is translated into the particular data structures, protocols and APIs required by each individual Back-End Hardware Provider 115 (including APIs for integrating on-premise computing resources without such scheduler functionality).

In addition to providing access to multiple Back-End Hardware Providers 115 (within and across HPC tasks, jobs and more complex workflows), the platform also provides HPC users 155 with a choice of multiple third-party software packages from multiple Software Providers 125. SW Abstraction Layer 120 manages the different APIs among the various Software Providers 125 integrate into the platform (e.g., for receiving software updates, exchanging invoices, usage reports and other billing and payment information, including electronic payments—with the assistance of Billing Manager 145 and Billing Layer 140).

ISV and Customer SW Manager 122 manages the platform's software library, a subset of which is made accessible to specified HPC users 155 based on the terms of their licenses to such third-party software (and its component features). ISV and Customer SW Manager 122 maintains distinct software "images" for each operating system on each Back-End Hardware Provider 115. In one embodiment, before a job is executed, the platform installs the relevant image so that it can be replicated as needed within the selected hardware environment. In this manner HPC users 155 are ensured in advance of the compatibility of the selected software with the specified hardware environment.

In another embodiment, the platform includes development and integration tools that enable HPC users 155 to develop and integrate proprietary software for their use during subsequent workflows and jobs. Such tools ensure compatibility with the available hardware environments and provide configuration tools to optimize for the best "HW-SW match" in accordance with the optimization factors specified by the HPC user 155. In yet another embodiment, the platform generates OS-independent "containers" to facilitate the installation of such software across different operating systems and Back-End Hardware Provider 115.

ISV and Customer SW Manager 122 also includes "virtual desktop" tools that facilitate analytics and other interactive GUI views during and after the execution of a workflow or job. Similar to "remote desktop" software in which applications are controlled locally, but execute remotely, virtual desktop functionality provides HPC users 155 with the ability to invoke and monitor certain aspects of their jobs during and after execution.

As noted above, different ISVs have different requirements for the location and use of their proprietary and third-party License Servers 128. License Server Abstraction Layer 127 provides significant flexibility in integrating with various different License Servers 128 (across multiple different ISVs) installed in virtually any physical location. For example, some ISVs may limit the location of the physical License Server 128 (e.g., to the ISV premises or the HPC user 155 premises), while others may permit the software implementing the license server functionality to be physically located anywhere—e.g., on a public cloud 116 (provided the ISV maintains sufficient control to ensure the integrity of the license server functionality).

License Manager 126 provides tools to ensure that the HPC user's license file on the relevant License Server 128 is accessible by the current job (e.g., for authentication and check-in and check-out purposes, as well as for ensuring that the terms of the license are strictly enforced)—regardless of its physical location. In certain cases, advance custom integration is required if the License Server 128 is located on the premises of an HPC user 155.

License Manager 126 works with HW and SW Metering Manager 180 to ensure that the terms of the license are strictly enforced. In one embodiment, HPC users 155 provide a "bring-your-own" (BYOL) license which the platform makes accessible via the relevant License Server 128 during the execution of a job. In another embodiment, the owner/operator of the platform also obtains advance authorization from the relevant ISVs to generate on-demand licenses (prepaid and otherwise) for this same purpose. In this scenario, if a BYOL license provided by an HPC user 155 fails (e.g., due to an outdated version or other reason), the platform can automatically redirect access to a platform-hosted License Server 128 to executed a job (or, in another embodiment, to provide on-demand "burst" capabilities in the event the HPC user 155 exceeded allotted usage requirements).

Due to this level of integration with the platform, HPC users 155 are freed from many of the constraints of existing BYOL (and even some on-demand) licensing schemes. The platform's level of integration with third-party License Servers 128 provides for two-way communication during execution of a job, and employs proxies to address firewall issues across various different Back-End Hardware Providers 115 (including on-premise firewalls at the HPC user's 155 physical location). By probing such License Servers 128 in advance, the platform avoids the costs of unnecessary hardware provisioning to HPC users 155 (e.g., in the event that the license authentication fails).

To assist HPC users 155 in setting up a workflow, Workflow Manager 170 provides tools that are insulated from the hardware and software compatibility issues with which HPC users 155 typically are forced to address. In other words, these workflow tools are at a higher level of abstraction, enabling HPC users 155 to focus on the functionality of their specific HPC tasks.

As alluded to above, Workflow Manager 170 includes templates and tools that enable HPC users 155 to implement loops, conditions and other control flow constructs both within and across individual HPC tasks and jobs (involving software packages from multiple Software Providers 125 executing across the hardware resources of multiple Back-End Hardware Providers 115). The output of one task can be redirected as input to subsequent tasks. Execution can branch to specified tasks based on intermediate results in accordance with specified constraints. For example, in the context of designing an airplane wing, a common repeated calculation or "sweep" involves varying the angle of the wing. The same calculation can be repeated in multiple test runs, varying only in the parameters used to define the angle of the wing.

Moreover, HW and SW Tuner 172 includes tools enabling HPC users 155 to design "test runs" to facilitate the selection of desired hardware resource and software configuration parameters. For example, an HPC user 155 can identify a relatively small portion of a job that is frequently repeated, and test that portion on multiple different hardware configurations. Once a desired configuration is determined, the desired hardware computing resources can be provisioned to execute the full job. In another embodiment, the HPC user 155 specifies conditions for the test runs which, if met, will automatically cause a reconfiguration and execution of the full job in the desired hardware environment. Such "hardware tuning" tools provide not only flexibility for testing purposes, but also provide cost savings by avoiding long expensive jobs that ultimately fail (or waste significant resources) due to a poor selection of hardware computing resources.

HW and SW Tuner 172 also includes "software tuning" tools that enable HPC users 155 to design test runs to measure the software-specific aspects of their workflows and jobs in an effort to identify the appropriate hardware computing resources. For example, HW and SW Tuner 172 enables HPC users 155 to test and compare the performance of different configurations (such as different implementations of a particular software driver) before selecting the desired configuration.

In other cases, more complex workflows can be developed based on intermediate results—e.g., repeating calculations until certain conditions are met, or invoking analytic software if other conditions are met. Moreover, partial or intermediate results may indicate that the hardware configuration needs to be altered—e.g., to include a GPU-only configuration, or to increase or decrease the number of provisioned VMs.

As noted above, HW and SW Tuner 172 also include optimization tools enabling HPC users 155 to specify optimization factors, such as job execution time and job cost, among others. Such tools provide automated means of discovering execution time and pricing "sweet spots" (e.g., balancing node costs, communication overhead, licensing restrictions and various other factors).

Analytics Manager 174 provides tools to customize the configuration of analytic software (e.g., included in the platform's software library) for use both during and after the execution of a job or more complex workflow. In one embodiment, such analytics software provides HPC users 155 with an interactive GUI-based tool that enable them not only to monitor intermediate results of a workflow, but also to affect those results by modifying certain parameters and visualize the effects of such modifications in real time.

Once an HPC user 155 has defined and configured a job or workflow, and tuned the hardware and software, HPC Task Manager 175 is employed to provision the specified computing resources on the selected hardware environment, install and configure the selected software and initiate execution of the workflow. HPC Task Manager 175 also monitors the execution of the workflow to obtain intermediate status (e.g., if a job or a portion thereof fails, such as a provisioned VM) and alert the HPC user 155 when the workflow completes or is prematurely terminated.

As noted above, HW and SW Metering Manager 180 monitors the usage of both hardware and software resources during execution of the workflow for a variety of different purposes. Monitored hardware and software usage data provides the basis for fee calculations—e.g., to invoice, provide reports and exchange payments with HPC users 155 and Partners 132, as well as Back-End Hardware Providers 115 and Software Providers 125. HW and SW Metering Manager 180 interacts with Billing Manager 145 and Billing Layer 140 in this regard.

Moreover, HW and SW Metering Manager 180 also works with License Manager 126 to monitor software usage and ensure compliance with relevant licensing schemes. As alluded to above, the platform's integration with hardware and software providers, and ability to monitor hardware and software usage at discrete levels of granularity, facilitates new types of pricing schemes. In addition to consumption-based on-demand pricing based on hardware and software usage (i.e., time), results-based and other forms of pricing (e.g., based on hardware resource consumption) can be supported in other embodiments.

For example, in one embodiment, pricing is based on the "success" of a job—measured by specified goals determined from the results extracted from the software during or after completion of a job. In another embodiment, advance purchases of blocks of time are supported—i.e., as nonrefundable amounts against which actual monitored hardware and/or usage is applied. Such block purchases are provided at "volume discount" prices, with overages either forbidden or charged at premium rates.

Various consumption-based, results-based and other hardware and software pricing and licensing schemes will be evident to those skilled in the art, all of which are supported by the platform's integration with multiple hardware and software providers, as well as its tightly integrated monitoring mechanisms both within and across individual tasks, jobs and more complex HPC workflows. This multi-provider approach affords HPC users 155 improved visibility into the costs of HPC workflows, as well as flexibility to optimize for cost, time and other desired factors by "mixing and matching" different hardware and software environments, "bursting" from on-premise hardware into the cloud for excess capacity, and other configuration, pricing and licensing options.

Figure 2:
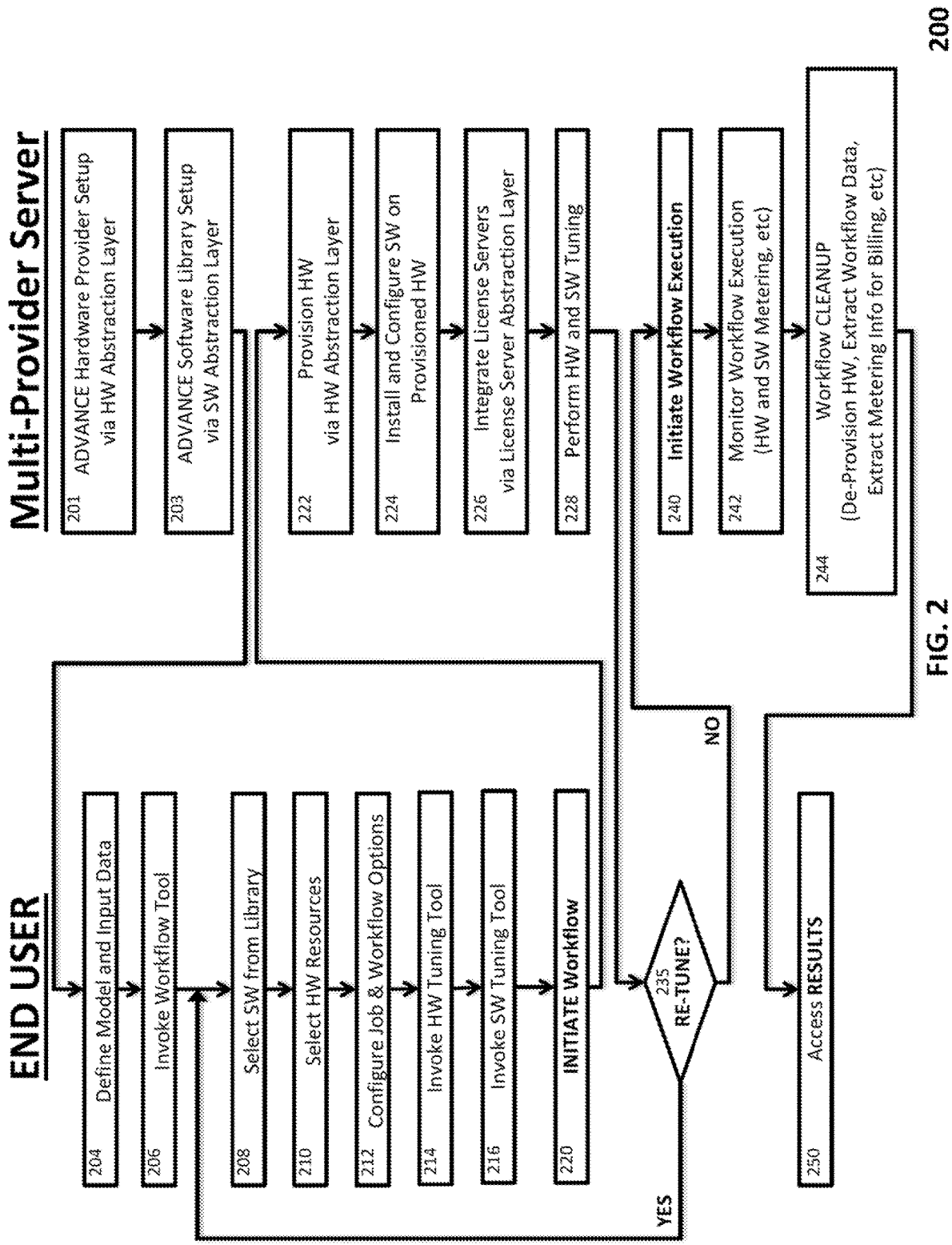
FIG. 2 is a flowchart illustrating one embodiment of an interactive workflow generation and execution process performed by a multi-provider server of the cloud-based platform of the present invention.

Flowchart 200 in FIG. 2 provides a dynamic look (from the perspective of an HPC user 155) into the design and execution of an HPC workflow. Before any HPC user 155 even begins to design a job or workflow, the platform establishes in advance hardware provider setups in step 201 with Back-End Hardware Providers 115 (via Hardware Abstraction Layer 110). In one embodiment, the platform provisions and installs the functionality of Multi-Provider Server 101 on a selected Back-End Hardware Providers 115, from which it provides the various abstraction and integration layers discussed above with other third-party providers.

Moreover, in step 202, the platform generates and installs images of each version of software in its software library for each supported operating system, along with the necessary software drivers. This enables the platform to install the appropriate image of any selected software package on any provisioned hardware environment with the assurance that compatibility has already been confirmed. The platform further implements, via User Interface Layer 150, the Web 156, CLI 157 and API Client 158 interfaces through which HPC users 155 access the platform.

When an HPC user 155 initially desires to prepare and execute a workflow on the platform, the user typically first defines its model and prepares the input data it will supply to initialize the desired software (in step 204). HPC user 155 then invokes the platform's workflow tool in step 206 and provides the platform with its model and input data. The platform's workflow tool presents HPC user 155 with the software library from which HPC user 155 selects, in step 208, one or more desired software packages. As noted above, a workflow can involve multiple software packages, whether as part of a single job or a more complex multi-job workflow.

Then, in step 210, the workflow tool presents HPC user 155 with a list of available hardware resource "core types" and other server configurations available from Back-End Hardware Providers 115. In one embodiment, the platform generates and presents these options at a higher level of abstraction than the specific core types and physical server configurations offered by each Back-End Hardware Provider 115. In other embodiments, the options identify the particular Back-End Hardware Providers 115 that provide such options (e.g., to enable HPC user 155 to select or avoid a desired provider).

In another embodiment, this list is filtered based upon the user's previous selection of software (e.g., if selected software is not compatible with, or otherwise unavailable on, certain back-end hardware provider platforms). In other embodiments, the platform analyzes the user's model and other input data, and provides recommended hardware resource options to HPC user 155 based on that analysis.

Once HPC user 155 selects from among the available hardware resource options, the platform's workflow tool presents HPC user 155 with an interface to configure the workflow and each component job. As discussed above, this configuration is application-dependent based upon the selected software packages, as well as the user's model and other input data. Here too, the choices are presented at a higher-level abstraction, as the platform automatically resolves any dependencies between the previously selected hardware and software options. In one embodiment, the workflow tool automatically configures those hardware-specific options that are determined based on the previously selected hardware computing resources (though additional specification of hardware-specific parameters, such as a desired number of cores, may still be required).

With the assistance of the platform's workflow tool, HPC user 155 determines the desired control flow configuration (e.g., if multiple HPC tasks and/or multiple jobs are involved) and specifies them in accordance with the options provided by the workflow tool. As described above, the workflow might involve multiple software packages, with the control flow determining the conditions under which subsequent software packages are invoked, as well as whether the results of one package are provided as input to another package.

If any pre-workflow hardware or software tuning is desired, HPC user 155 invokes the HW Tuning tool in step 214 and/or the SW Tuning Tool in step 216. In one embodiment, the platform presents common templates for hardware and software tuning. In another embodiment, an optimizer tool is provided, enabling HPC user 155 to specify desired optimization factors (e.g., time, cost, etc.) as well as conditions under which specified hardware resource configurations will be accepted or rejected. In yet another embodiment, HPC user 155 provides a custom script specifying the precise control flow of hardware and/or software tuning processes.

HPC user 155 initiates the defined workflow in step 220. Note, however, that if HPC user 155 specified any hardware or software tuning "test runs" in steps 214 or 216, then the platform will execute those test runs first, as explained below.

In step 222, Multi-Provider Server 101 provisions the selected hardware computing resources on the one or more Back-End Hardware Providers 115 selected by (or generated for) HPC user 155 in step 210. Multi-Provider Server 101 also replicates the model and user input data into the provisioned hardware environment.

In step 224, Multi-Provider Server 101 installs the appropriate versions of the selected software images into the provisioned hardware environment, and then configures such software in accordance with the specified configuration defined in step 212. As noted above, multiple instances of the software may be further replicated (e.g., into multiple VMs or physical servers, and potentially across multiple back-end hardware providers) depending upon the hardware resource configuration (e.g., based on the number of specified cores). Additional instances may also be replicated and/or destroyed during execution of the workflow.

In step 226, Multi-Provider Server 101 configures connections between the software installed and configured in the provisioned hardware environment and each relevant License Server 128 (via SW Abstraction Layer 120). This enables the software to execute properly once HPC user 155 is authenticated and individual features are checked out and checked in during execution of the workflow.

In one embodiment, license keys with relatively short durations (e.g., 1 day instead of 1 year) are generated repeatedly to provide an added layer of security (e.g., to prevent "phony" license servers from continuing operation upon obtaining a valid license key). License Manager 126 manages frequent (e.g., daily) communications with the relevant License Servers 128 (via SW Abstraction Layer 120) to authenticate these frequently regenerated license keys and ensure continued access by authorized HPC users 155.

At this point, in step 228, Multi-Provider Server 101 performs any specified hardware and/or software tuning test runs. Though typically far smaller and quicker than actual jobs or workflows, these test runs may, in one embodiment, result in automatic reconfiguration of the specified computing resources. In other embodiments, the platform generates recommendations to HPC user 155, or merely provides results from which HPC user 155 makes its own determining regarding any such reconfigurations.

Thus, in step 235, the HPC user 155 (or the platform, in the other embodiments discussed above), determines whether to "re-tune" the hardware and/or software selections previously made in steps 208 and 210. If re-tuning is necessary or desired, control returns to step 208 (at which point further hardware and/or software tuning may or may not occur, depending on whether HPC user 155 re-invokes the hardware and/or software tuning tool. As noted above, in one embodiment (not shown), the platform automatically reconfigures the computing resources and re-initiates the workflow execution in step 220 (as re-provisioning may be required).

Otherwise, once no re-tuning is dictated in step 235, Multi-Provider Server 101 initiates execution of the "full" workflow in step 240. As described above, the platform monitors execution of the workflow in step 242, including hardware and software metering (for usage and billing purposes), as well as for implementation of the control flow specified in the workflow.

Upon completion of the workflow execution (including early termination in certain instances), the platform implements a "cleanup" process in step 244. Results are extracted, stored and provided to the HPC user 155 in step 250 (via User Interface Layer 150). In addition, the platform de-provisions hardware resources and extracts and stores metered hardware and software usage information on the platform for billing and other purposes, as described above. As also described above, analytics may be performed on the results (including, in one embodiment, during execution of the workflow), though execution of such analytics software is considered part of the workflow itself (as such software is part of the platform's software library).

The present invention has been described herein with reference to specific embodiments as illustrated in the accompanying Figures. Many variations of the embodiments of the functional components and dynamic operation of the present invention will be apparent to those skilled in the art without departing from the spirit of the present invention.

The invention claimed is:

1. An integrated cloud-based platform, comprising:
   (a) a back-end hardware provider abstraction layer that enables a user of the platform to configure a job by selecting from among a plurality of hardware core types across a plurality of back-end hardware providers;
   (b) a manager that provisions the hardware resources associated with the selected hardware core type from the associated back-end hardware provider, and invokes the execution of the user's job;
   (c) a hardware metering module that monitors the usage of the provisioned hardware during execution of the job; and
   (d) a user interface layer that makes the results of the job accessible to the user.

2. The integrated cloud-based platform of claim 1, further comprising a software abstraction layer that enables the user to further configure the job by selecting from among a plurality of software packages across a plurality of software providers.

3. The integrated cloud-based platform of claim 1, further comprising a software metering module that monitors the usage of the selected software package during execution of the job.

4. The integrated cloud-based platform of claim 1, further comprising a license server abstraction layer that implements a network connection between the user's job and a license server associated with the software package selected by the user.

5. An integrated cloud-based platform, comprising:
   (a) a back-end hardware provider abstraction layer that enables a user of the platform to configure a job by selecting from among a plurality of hardware core types across a plurality of back-end hardware providers;
   (b) A software abstraction layer that enables the user to further configure the job by selecting from among a plurality of software packages across a plurality of software providers;
   (c) a manager that provisions the hardware resources associated with the selected hardware core type from the associated back-end hardware provider, and invokes the execution of the user's job; and
   (d) a hardware metering module that monitors the usage of the provisioned hardware during execution of the job.

6. The integrated cloud-based platform of claim 5, further comprising a software metering module that monitors the usage of the selected software package during execution of the job.

7. The integrated cloud-based platform of claim 5, further comprising a license server abstraction layer that implements a network connection between the user's job and a license server associated with the software package selected by the user.

8. An integrated cloud-based platform, comprising:
   (a) a back-end hardware provider abstraction layer that enables provisioning of computing resources across a plurality of back-end hardware providers, wherein the back-end hardware abstraction layer translates a uniform formulation of computing resources into a first core type that is specific to a first back-end hardware provider; and
   (b) a task manager that (i) provisions a first task with a first set of computing resources associated with the first core type on the first back-end hardware provider, and (ii) initiates execution of the first task.

9. The integrated cloud-based platform of claim 8, wherein the back-end hardware provider abstraction layer translates the uniform formulation of computing resources into a second core type that is specific to a second back-end hardware provider, and the task manager (i) provisions a second task with a second set of computing resources associated with the second core type on the second back-end hardware provider, and (ii) initiates execution of the second task.

* * * * *